United States Patent [19]

Jacobs

[11] 3,965,802

[45] June 29, 1976

[54] HYDRAULIC DRIVE FOR OPERATING AN ELEVATOR

[76] Inventor: Max Jacobs, 179 Wittkullerstrasse, Solingen-Wald, Germany

[22] Filed: Nov. 26, 1973

[21] Appl. No.: 419,159

[30] Foreign Application Priority Data

Nov. 27, 1972 Germany .......................... 2258065

[52] U.S. Cl. ................................ 92/84; 74/501 R; 92/137; 92/140; 92/153; 187/17; 254/93 VA

[51] Int. Cl.[2] ........................................ F16J 1/10

[58] Field of Search ............... 92/84, 89, 129, 86.5, 92/137, 140, 90, 153; 74/501 R; 254/93 R, 93 VA; 187/17

[56] References Cited

UNITED STATES PATENTS

| | | | |
|---|---|---|---|
| 368,016 | 8/1887 | Schrankel | 92/137 |
| 991,549 | 5/1911 | Schuchardt | 187/17 |
| 1,499,240 | 6/1924 | Manry | 92/137 |
| 2,140,264 | 12/1938 | Kingham | 254/93 VA X |
| 2,222,685 | 11/1940 | Raymond | 187/17 |
| 2,441,719 | 5/1948 | Potter | 74/501 |
| 2,524,449 | 10/1950 | Kellogg | 92/137 X |
| 2,651,454 | 9/1953 | Bjurström | 92/129 X |
| 2,869,377 | 1/1959 | Pietersc | 74/501 R X |
| 3,121,371 | 2/1964 | Graham | 92/137 X |
| 3,252,547 | 5/1966 | Hornedo | 187/17 |
| 3,304,878 | 2/1967 | Sabre | 74/501 X |
| 3,436,130 | 4/1969 | Grebert | 74/501 X |
| 3,546,762 | 12/1970 | Martin | 29/434 X |
| 3,546,961 | 12/1970 | Marton | 74/501 R |
| 3,623,400 | 11/1971 | Binhack et al. | 187/17 X |
| 3,771,384 | 11/1973 | Hackman | 74/501 R X |

FOREIGN PATENTS OR APPLICATIONS

| | | | |
|---|---|---|---|
| 184,440 | 6/1887 | France | 187/17 |
| 583,883 | 1/1947 | United Kingdom | 74/501 |

*Primary Examiner*—Martin P. Schwadron
*Assistant Examiner*—Abraham Hershkovitz
*Attorney, Agent, or Firm*—Neil F. Markva

[57] ABSTRACT

A hydraulic drive for operating an elevator and disposed inside the elevator shaft on one side of the load-lifting member of the elevator comprises a hydraulic ram cylinder having two straight cylinder portions connected by a portion forming an arcuate bend. One straight cylinder portion extends up the path of ascent of the load-lifting member of the elevator, whereas the other straight cylinder portion slidably contains a hydraulic ram piston attached to one end of a universally flexible thrust-transmitting strand. The other end of the flexible strand is attached to a cylindrical body arranged to slide up and down said one straight cylinder portion and is provided with a carrier arm projecting to the outside through an axial slot in said one straight cylinder portion for supporting the load-lifting member of the elevator.

15 Claims, 7 Drawing Figures

HYDRAULIC DRIVE FOR OPERATING AN ELEVATOR

BACKGROUND OF THE INVENTION

This invention relates generally to elevators, and more specifically to a hydraulic drive for operating an elevator and disposed inside the elevator shaft on one side of the load-lifting member of the elevator.

Conventional hydraulic drive means in an elevator shaft for a load-lifting member that is to be lifted to a considerable height comprise a plurality of hydraulic ram cylinders so disposed that the rams become operative in succession. The lengths of the piston rods of the ram cylinders must be so designed that there is no danger of the piston rods bucking under the load. This danger is present in forms of construction in which the ram cylinders are designed jointly to lift the load-lifting member to its maximum height. Frequently this will not be sufficient to meet particular needs. Arrangements in which the hydraulic rams operate in succession are naturally expensive because of the need for the provision of a plurality of such rams, which are costly. Moreover, such drives are of complicated construction. Furthermore, in the event of their being disposed on the side of the load-lifting member, e.g. of an elevator cage, they call for the provision of complicated coupling means for automatically coupling and uncoupling the rams to and from the cage. A hydraulic drive for operating an elevator has already been proposed which comprises a hydraulic cylinder containing two ram pistons connected by an interposed hollow cylindrical member having an external diameter corresponding with the internal diameter of the hydraulic cylinder. This cylindrical member is fitted with a carrier resembling a bracket arm which projects to the outside through an axial slot in the wall of the hydraulic cylinder for carrying the elevator cage. The slot is sealed by a sealing strand which partly embraces the hydraulic pistons and extends through the cylindrical member to permit the carrier arm on the cylindrical member to project through the slot in the hydraulic cylinder. However, in the event of the cage being required to ascend to a major height a pressure-tight seal of the slot in the wall of the hydraulic cylinder is impossible to achieve because of the magnitude of the pressure range, particularly bearing in mind that continuous operation leads to premature wear of the seal.

SUMMARY OF THE INVENTION

It is therefore the object of the invention to provide a hydraulic drive for operating an elevator, which permits an elevator cage to be lifted to nearly any height with the aid of only one hydraulic ram.

To attain this object the present invention provides a hydraulic drive for operating an elevator and disposed inside the elevator shaft on one side of the load-lifting member of the elevator, which comprises a hydraulic ram cylinder having two straight cylinder portions connected by a portion forming an arcuate bend, one straight cylinder portion extending up the path of ascent of a load-lifting member and the other straight cylinder portion slidably containing a hydraulic ram piston attached to one end of a universally flexible thrust-transmitting strand of which the other end is attached to a cylindrical body arranged to slide up and down said one straight cylinder portion, said cylindrical body being provided with a carrier arm projecting to the outside through an axial slot in said one straight cylinder portion of supporting the load-lifting member of the elevator.

BRIEF DESCRIPTION OF THE DRAWINGS

The invention will now be described by way of example and with reference to the accompanying drawings, in which.

DESCRIPTION OF THE PREFERRED EMBODIMENTS

Figure 1:
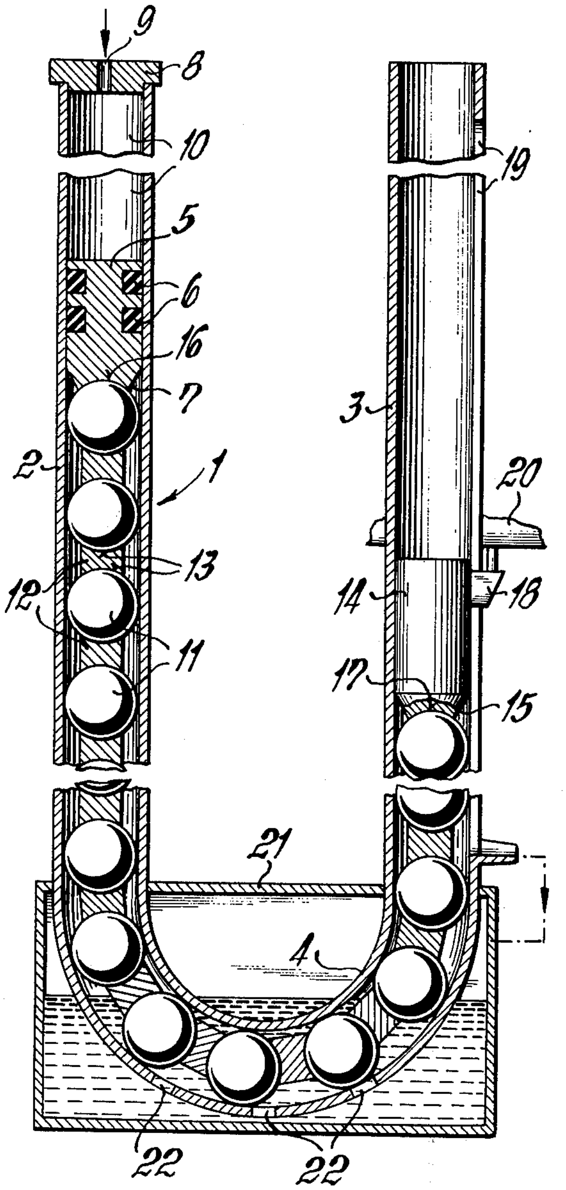
FIG. 1 is a longitudinal section of one embodiment of the proposed drive.

With reference to FIG. 1 there is provided a hydraulic drive comprising a U-shaped hydraulic ram cylinder 1 having two straight portions 2 and 3 connected by an arcuate bend 4. The straight portion 2 slidably contains a hydraulic ram piston 5 provided with sealing rings 6. The underside of the hydraulic piston 5 is formed with an extension 7 shaped like a truncated cone. The upper end of the straight portion 2 of the ram cylinder 1 is closed by a cap 8. The latter contains an opening 9 for the passage therethrough of a hydraulic fluid which can be pumped by a pump (not shown) into the working chamber 10 of the hydraulic ram cylinder 1. The thrust of the hydraulic piston 5 is transmitted by a flexible thrust-transmitting strand consisting of a plurality of ball-shaped members 11 which are slidably contained in the interior of the hydraulic ram cylinder 1. The ball-shaped members 11 have a diameter which corresponds to the internal diameter of the hydraulic ram cylinder 1 and are separated by spacers 12 which have an overall diameter that is less than the internal diameter of the hydraulic ram cylinder 1. That is, the strand has a cross-sectional linear dimension effective to be contained between opposing sides of the housing so that axial movement of the piston 5 within the housing 2 effects a corresponding axial movement of a carrier body 14. For the purpose of forming a joint between each two neighboring ball-shaped members 11 each spacer 12 is formed with two spherical sockets 13 each for the reception of part of one of the two neighboring ball-shaped members. The other straight portion 3 of the hydraulic ram cylinder 1 contains the cylindrical carrier body 14 which has an external diameter designed to fit the inside diameter of the straight portion 3 of the hydraulic ram cylinder. On its underside the cylindrical body 14 likewise has an extension 15 shaped like a truncated cone. The free end of each of the two extensions 7 and 15 contains a spherical socket 16 and 17 forming a bearing for the adjoining ball-shaped members 11. All the ball-shaped members 11 are thus associated with the interposed spacers 12 to form a universally flexible thrust-transmitting strand. Attached to the body 14 is a carrier arm 18 which projects from the hydraulic ram cylinder 1 to the outside through an axial slot 19 in the side of the straight portion 3. This carrier arm 18 supports a load-lifting member, e.g. an elevator cage 20, of which only a small portion is actually shown in the drawings. The axial slot 19 extends up the entire height the elevator cage 20 is intended to ascend. The arcuate bend 4 of the hydraulic ram cylinder 1 is contained in a reservoir 21 filled with a lubricant. The walls of the bend 4 of the hydraulic ram cylinder 1 are provided with openings 22 through which the lubricant can enter. Consequently the ball-shaped members 11 and the spacers 12 inside the bend 4 where most of the friction arises are completely immersed in the lubricant.

The described arrangement functions as follows:

Operation of a switch starts up the pump which at once pumps fluid through the opening 9 in the cap 8 of the straight portion 2 of the hydraulic ram cylinder 1 into the working chamber 10. The hydraulic ram piston 5 is forced downwards and through the intermediate chain of ball-shaped members 11 and spacers 12 simultaneously lifts the cylindrical body 14 and thus the elevator cage 20. The lubricant which is entrained escapes through the axial slot 19 in the wall of the straight portion 3 of the hydraulic ram cylinder 1 and is returned into the reservoir 21. The elevator cage 20 descends when fluid is exhausted from the working chamber 10 to allow the piston 5 to be pushed back into its former position by the weight of the cage 20 forcing the cylindrical body 14 downwards and displacing the ball-shaped members 11 and spacers 12 of the flexible strand.

Figure 2:
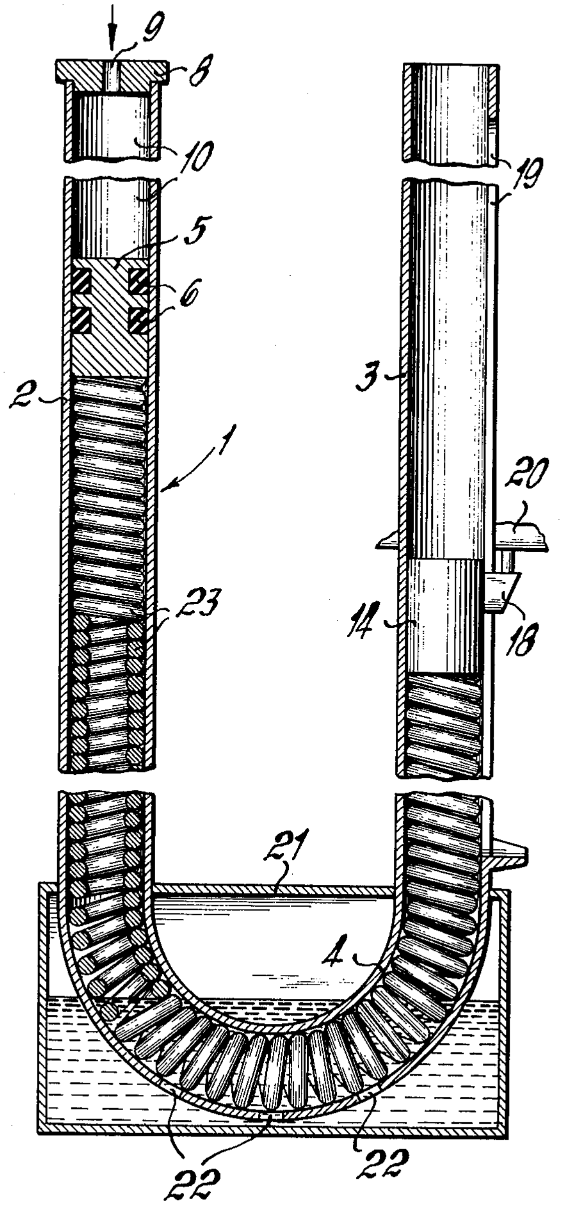
FIG. 2 is a longitudinal section of another embodiment of the invention.

In the embodiment illustrated in FIG. 2 of the drawings the flexible strand has the form of a helical coil spring 23 which is likewise immersed in lubricant in a reservoir 21 which contains the U-bend 4 of the hydraulic ram cylinder 1. One end of the coil spring 23 bears against the hydraulic ram piston 5, whereas the other end bears against the cylindrical carrier body 14.

Figure 3:
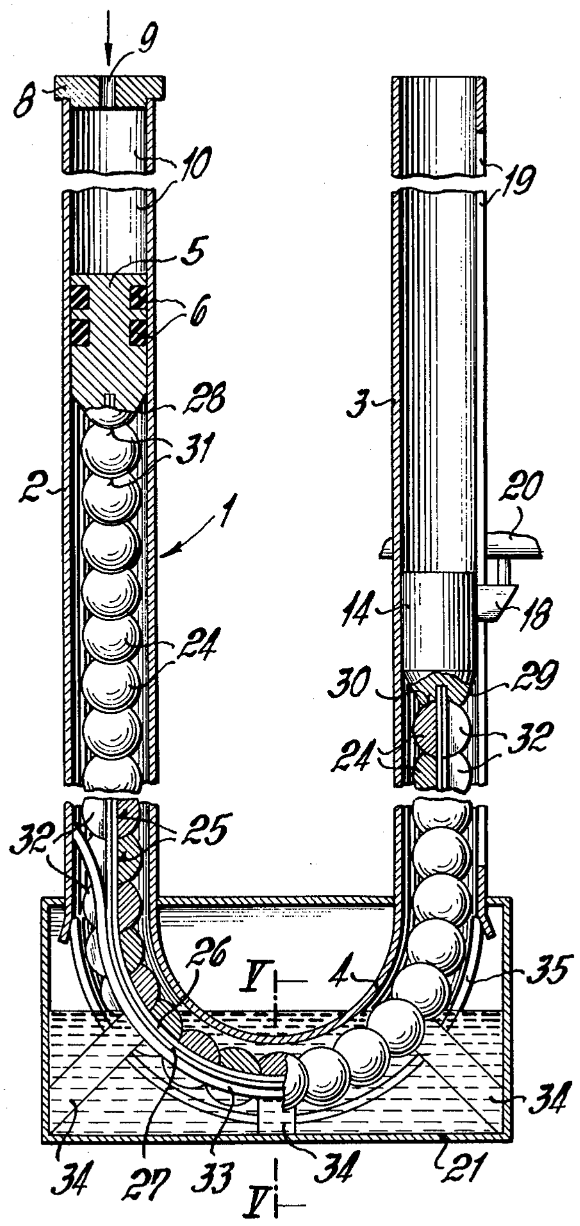
FIG. 3 is a longitudinal section of a third embodiment.
Figure 5:
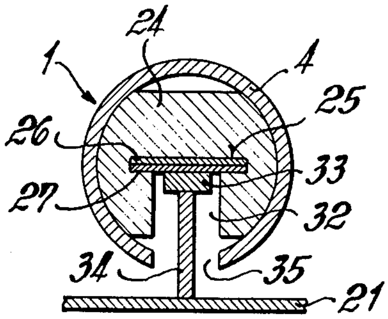
FIg. 5 is an enlarged cross section taken on the line V — V of FIG. 3.
Figure 4:
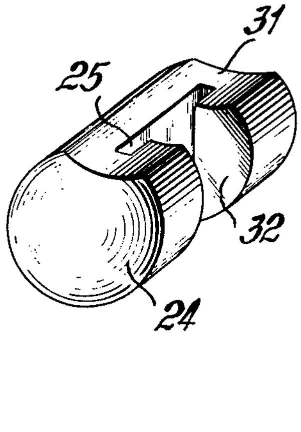
FIG. 4 is a perspective view of one member of the flexible strand.

In the arrangement illustrated in FIGS. 3 to 5 the flexible strand is composed of a train of mutually contacting cylindrical members 24. These are placed with their axes in the horizontal and their lateral ends slidably bearing against the inside of the hydraulic ram cylinder 1, the ends being of convex shape to correspond with the internal cylinder radius. These members 24 each contain a slot 25 and the slots align to enable them slidably to receive two steel ribbons 26 and 27 which abut face to face and fix the relative positions of all the members 24. One end of the two steel ribbons 26 and 27 is fitted into an extension 28 having a part cylindrical rounded face on the underside of a hydraulic ram piston 5, whereas the other ends are fitted into an extension 29 on the underside of a cylindrical carrier body 14. This extension 29 is formed on its underside with a part cylindrical concavity 30. Each member 24 is also formed with a like part cylindrical concavity 31. Each of these concavities forms the bearing surface for the next member 24 and adjacent the ram piston 5 for the spherically rounded extension 28. Moreover, the member 24 which adjoins the extension 29 of the body 14 engages the part cylindrical concavity 30 in the extension 29. In the described manner the members 24 all positively and hingeably interfit from the extension 28 of the hydraulic ram piston 5 to the extension 29 on the cylindrical body 14 and they form a solid flexible strand or ram. Each member 24 also contains a recess 32 normal to the plane of the steel ribbons 26 and 27, this recess being open towards the steel ribbons 26 and

27 as well as towards the external circumference of the member 24. In the arcuate bend 4 of the hydraulic ram cylinder 1 a rail 33 is provided and curved to correspond with the radius of the bend 4. The two ends of the rail are both secured to the inside wall of the hydraulic ram cylinder 1 and inside the reservoir 21 the rail is supported by stays 34. The stays 34 pass through a slot 35 in the wall of the bend 4 of the hydraulic ram cylinder 1. The rail 33 engages the recesses 32 of those members 24 which are in course of being guided through the bend 4, and it thus serves as a slideway for the adjacent steel ribbon 27 as it negotiates the bend. The components of the flexible strand are again lubricated by a lubricant inside a reservoir 21, the lubricant entering the interior of the bend 4 through the slot 35 in its wall.

Figure 6:
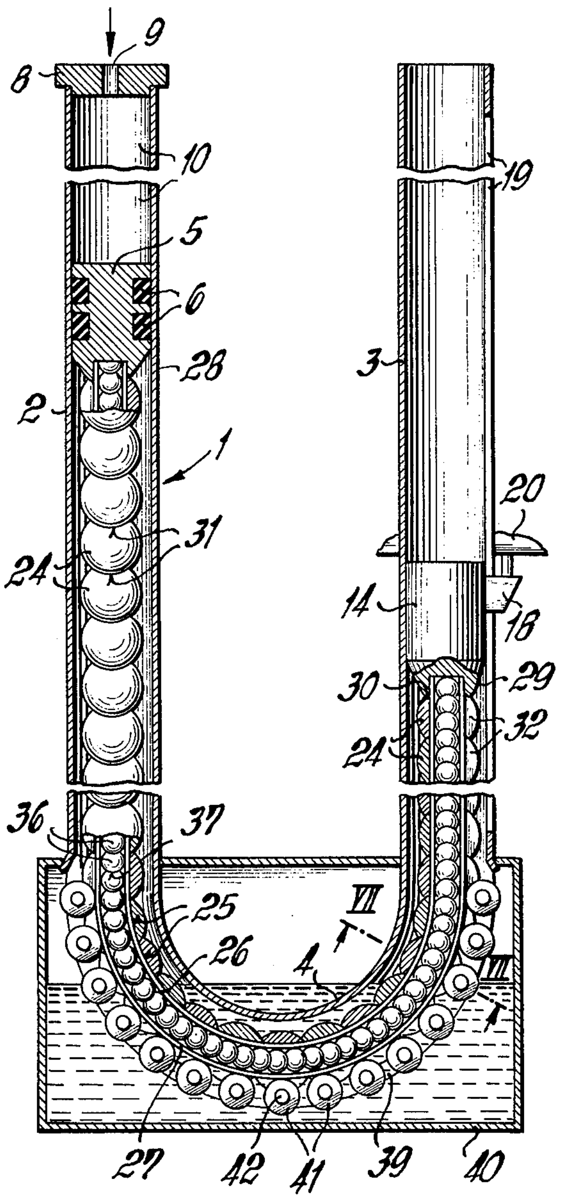
FIG. 6 is a longitudinal section of yet another embodiment of the invention.
Figure 7:
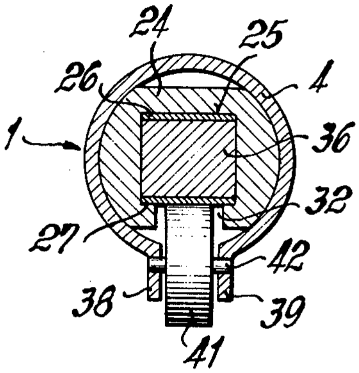
FIG. 7 is an enlarged cross section taken on the line VII — VII of FIG. 6.

In the embodiment illustrated in FIGS. 6 and 7 of the drawings cylindrical elements 36 which interfit horizontally are mounted between the steel ribbons 26 and 27 on which the members 24 are strung. Each element 36 contains a part cylindrical concavity 37 which extends along the length of the element, the adjacent cylindrical element 36 engaging this concavity. The elements 36 are thus interfitted in a manner forming a flexible strand or train. The longitudinal edges of the slot 36 in the wall of the bend 4 of the hydraulic ram cylinder 1 are formed with flanges 38 and 39. 40 is a box-shaped tank enclosing the bend 4 and 41 are rollers on axles 42. These axles are mounted in the flanges 38 and 39. The rollers 41 project into the recesses 32 of the nearest cylindrical member 24 and their peripheries bear against the nearest steel ribbon 27. Whe the arrangement is in operation the steel ribbon 27 of the strand passing through the bend 4 makes rolling contact with the rollers 41 and this minimizes the friction experienced in the bend 4 of the hydraulic ram cylinder 1 which is otherwise here greater than elsewhere in the cylinder.

The invention may be embodied in other specific forms without departing from the spirit or essential characteristics thereof. The embodiments are therefore to be considered in all respects as illustrative and not restrictive.

What is claimed is:

1. Elevator hydraulic drive means adapted for disposition inside the shaft of the elevator on one side of the load-lifting member thereof, said drive means comprising:

a. a hydraulic ram cylinder including a pair of vertical straight cylinder portions, and an arcuate bend portion connecting the lower ends of said straight cylinder portions, a first one of said straight cylinder portions extending up the path of ascent of the load-lifting member and having an axial slot in the wall thereof;

b. a hydraulic ram piston slidably mounted in the other straight cylinder portion;

c. a carrier body slidably mounted in said first straight cylinder portion and including a carrier arm that extends radially outwardly through said slot and supports the load-lifting member of the elevator;

d. universally flexible thrust-transmitting strand means cooperating at one end with said piston for transmitting thrust force in a direction parallel to and transverse to the axis of the cylinder portions, said strand means extending through said arcuate bend portion and cooperating at its other end with said carrier body; and e. said piston being movable in opposing directions within said other straight cylinder portion causing corresponding movement of the carrier body in opposing directions within said first straight cylinder portion.

2. Apparatus as defined in claim 1, wherein said thrust-transmitting strand means comprises 1. a plurality of spaced ball-shaped members having a diameter corresponding with the internal diameter of said hydraulic ram cylinder; and 2. a plurality of spacer elements each of which is interposed between a pair of said ball-shaped members, respectively, each of said spacer elements, said piston and said carrier body containing a spherical socket that constitutes a bearing surface for the adjacent ball-shaped member.

3. Apparatus as defined in claim 1, wherein said flexible thrust-transmitting strand means comprises a helical coil spring the opposite ends of which abut said piston and said carrier body, respectively.

4. Apparatus as defined in claim 1, and further including a lubricant reservoir, said arcuate bend portion extending through said reservoir and containing opening means permitting the introduction of lubricant from said reservoir into said arcuate bend portion.

5. Apparatus as defined in claim 1, wherein said piston acts in a single direction downwardly to effect corresponding upward movement of the carrier body, and subsequently said piston being moved upwardly by the action of the load being carried by the carrier arm as the carrier body moves downwardly.

6. Elevator hydraulic drive means comprising:

a. a single hydraulic ram housing disposed inside the shaft of an elevator on one side of the load-lifting member thereof, b. said housing including a pair of vertically disposed straight housing portions and an arcuate bend portion connecting the lower ends of the straight portions, c. a first one of the straight portions extending upwardly along the path of ascent of the load-lifting member and having an axial slot in the wall thereof, d. piston means slidably mounted in the other straight portion, e. carrier body means slidably mounted in the first straight portion including carrier arm means extending outwardly through said slot for supporting said load-lifting member, f. universally flexible thrust-transmitting strand means cooperating at one end thereof with piston means and at the other end thereof with the carrier body means for transmitting thrust force in directions parallel to and transverse to the axis of the cylinder portions, g. said strand means having a cross-sectional linear dimension effective to be contained between opposing sides of the housing, and h. said piston means being axially movable in opposing directions within the housing causing corresponding axial movement of the carrier body means in opposing axial directions within said first straight portion thereby causing vertical movement of the elevator.

7. Elevator hydraulic drive means adapted for disposition inside the shaft of the elevator on one side of the load-lifting member thereof, said drive means comprising:

a. a hydraulic ram cylinder including a pair of vertical straight cylinder portions and an arcuate bend portion connecting the lower ends of said cylinder portions, a first one of said straight cylinder portions extending up the path of ascent of the load-lifting member and having an axial slot in the wall thereof;

b. A hydraulic ram piston slidably mounted in the other straight cylinder portion;

c. a carrier body slidably mounted in said first straight cylinder portion and including a carrier arm that extends radially outwardly through said slot and supports the load-lifting member of the elevator;

d. universally flexible thrust-transmitting strand means cooperating at one end with said piston for transmitting thrust force in a direction parallel to and transverse to the axis of the cylinder portions;

e. said thrust-transmitting strand means including a train of cylindrical members, metal ribbon means and support means and extending through said arcuate end portion and cooperating at its other end with said carrier body;

f. said cylindrical members being horizontally arranged and contiguously hingedly interconnected and having convex ends in sliding contact with, and the configuration of said ends corresponds with, the internal radius of the internal surface of said hydraulic ram cylinder;

g. said cylindrical members having aligned diametrically extending slots intermediate their ends and a radial access opening which extends orthogonally from said slot to the peripheral surface of said cylindrical member;

h. said metal ribbon means being connected at one end with said pistons and extending through said aligned slots and being connected at its other end with said carrier body;

i. said support means being mounted in and having the same radius of curvature as said arcuate bend portion and extending into said access recesses for supportably guiding said metal ribbon means as said flexible strand means travels through said arcuate bend portion;

j. said piston being movable in opposing directions within said other straight cylinder portion causing corresponding movement of the carrier body in opposing directions within said first straight cylinder portion.

8. Apparatus as defined in claim 7, wherein said support means comprises a stationary rail; and further including means for supporting said rail in said arcuate bend portion.

9. Apparatus as defined in claim 7, wherein said metal ribbon means comprises a pair of spaced parallel metal ribbons, and a plurality of flexibly interconnected cylindrical bearing elements arranged between said metal ribbons; and further wherein said support means comprises a plurality of rollers which project into said access recesses contained in said cylindrical members, said rollers being in load-bearing engagement with the adjacent metal ribbon to guide the same through said arcuate bend portion.

10. Apparatus as defined in claim 7, wherein each of the cylindrical members of the train contains on its cylindrical peripheral surface a longitudinally-extending concave cylindrical recess dimensioned to receive in hinged engagement the cylindrical surface of the next member of the train, the transverse slot contained in each cylindrical member extending at one end from said recess diametrically through said cylindrical member; and further wherein one of said piston and carrier members contains a cylindrical recess for receiving the cylindrical surface of the adjacent cylindrical element, and the other of said piston and carrier members contains a cylindrically rounded bottom end that extends into the cylindrical recess contained in the adjacent cylindrical member.

11. Apparatus as defined in claim 9, wherein each of said cylindrical bearing elements arranged between said metal ribbons includes a concave recess for receiving in hinged cooperation the cylindrical peripheral surface of the adjacent cylindrical bearing element.

12. Elevator hydraulic drive means adapted for disposition inside the shaft of the elevator on one side of the load-lifting member thereof, said drive means comprising:

a. a hydraulic ram cylinder including a pair of vertical straight cylinder portions and an arcuate bend portion connecting the lower ends of said straight cylinder portions;

b. a first one of said straight cylinder portions extending up the path of ascent of the load-lifting member and having an axial slot in the wall thereof;

c. a hydraulic ram piston slidably mounted in the other straight cylinder portion;

d. a carrier body slidably mounted in said first straight cylinder portion and including a carrier arm that extends radially outwardly through said slot and supports the load-lifting member of the elevator; and e. universally flexible thrust-transmitting strand means cooperating at one end with said piston for transmitting thrust force in a direction parallel to and transverse to the axis of the cylinder portions, said strand means extending through said arcuate bend portion and cooperating at its other end with said carrier body;

f. said thrust-transmitting strand means including a plurality of members having a diameter corresponding with the internal diameter of said hydraulic ram cylinder to form opposing surface portions in sliding contact with the inside surface of the ram cylinder for transmitting a load force in a direction transverse to the axis of said cylinder;

g. said members having a further curved bearing surface portion for transmitting a load force in a direction parallel to the axis of said cylinder;

h. said piston being movable in opposing directions within said other straight cylinder portion causing corresponding movement of the carrier body in opposing directions within said first straight cylinder portion.

13. Apparatus as defined in claim 12, wherein said thrust-transmitting strand means includes a plurality of spacer elements and said members are ball-shaped with said curved bearing surface portion of each ball-shaped member being contiguous to a spherical socket located in each spacer element.

14. Apparatus as defined in claim 12, wherein said members are cylindrically-shaped and horizontally disposed within said cylinder, said members having opposed convex ends forming said opposing surface portions.

15. Apparatus as defined in claim 14, wherein each of the cylindrical members of the train includes a concave cylindrical recess extending longitudinally along its peripheral surface to slidingly receive said further curved bearing surface portion of the next adjacent member of the train.

* * * * *